United States Patent
Lakraa (10) Patent No.: US 12,501,941 B2
(45) Date of Patent: Dec. 23, 2025

(54) METHOD OF MANAGING AN AEROSOL-GENERATING DEVICE

(71) Applicant: JT International SA, Geneva (CH)

(72) Inventor: Karima Lakraa, Lausanne (CH)

(73) Assignee: JT International SA (CH)

( * ) Notice: Subject to any disclaimer, the term of this patent is extended or adjusted under 35 U.S.C. 154(b) by 377 days.

(21) Appl. No.: 18/005,247

(22) PCT Filed: Jul. 8, 2021

(86) PCT No.: PCT/EP2021/069012
§ 371 (c)(1),
(2) Date: Jan. 12, 2023

(87) PCT Pub. No.: WO2022/013060
PCT Pub. Date: Jan. 20, 2022

(65) Prior Publication Data
US 2023/0248068 A1    Aug. 10, 2023

(30) Foreign Application Priority Data
Jul. 15, 2020    (EP) .................................... 20186051

(51) Int. Cl.
*A24F 40/51* (2020.01)
*A24F 40/53* (2020.01)
*A24F 40/60* (2020.01)

(52) U.S. Cl.
CPC .............. *A24F 40/53* (2020.01); *A24F 40/51* (2020.01); *A24F 40/60* (2020.01)

(58) Field of Classification Search
None
See application file for complete search history.

(56) References Cited

U.S. PATENT DOCUMENTS

| | | | |
|---|---|---|---|
| 2015/0272223 A1* | 10/2015 | Weigensberg | A24F 40/53 |
| | | | 131/328 |
| 2016/0158782 A1 | 6/2016 | Henry, Jr. et al. | |
| 2017/0027229 A1 | 2/2017 | Cameron | |
| 2018/0220711 A1 | 8/2018 | Suzuki et al. | |
| 2019/0158938 A1 | 5/2019 | Bowen et al. | |

(Continued)

FOREIGN PATENT DOCUMENTS

| | | |
|---|---|---|
| CN | 210809317 U | 6/2020 |
| EP | 3542656 A1 | 9/2019 |

(Continued)

OTHER PUBLICATIONS

Translation provided by Clarivate Analytics, 17 pages (Year: 2022).*

(Continued)

*Primary Examiner* — Philip Y Louie
(74) *Attorney, Agent, or Firm* — Lerner David LLP (57) ABSTRACT

The invention discloses a method of operating an aerosol generating device comprising recording a period of active use of the device; detecting a puff inhaled by a user; determining if a battery-level notification had been provided to the user in the said period before the puff detection; determining a battery-level of the device if no notification had been provided previously; and generating an indication on the device for the user if the determined battery-level is below a predetermined level.

14 Claims, 4 Drawing Sheets

(56) References Cited

U.S. PATENT DOCUMENTS

| | | |
|---|---|---|
| 2019/0269175 A1 | 9/2019 | Bache et al. |
| 2019/0335816 A1 | 11/2019 | Yamada et al. |
| 2020/0108213 A1 | 4/2020 | Akao |
| 2020/0136398 A1 | 4/2020 | Yamada et al. |

FOREIGN PATENT DOCUMENTS

| | | | | |
|---|---|---|---|---|
| EP | 3995018 A1 * | 5/2022 | ............ | A24F 40/53 |
| JP | 3215509 U | 3/2018 | | |
| JP | 6617189 B1 | 12/2019 | | |
| JP | 2020005602 A | 1/2020 | | |
| JP | 6644157 B2 | 2/2020 | | |
| JP | 2020058236 A | 4/2020 | | |
| WO | 2014066730 A1 | 5/2014 | | |
| WO | 2015081554 A1 | 6/2015 | | |
| WO | 2017056282 A1 | 4/2017 | | |

OTHER PUBLICATIONS

International Search Report for PCT/EP2021/069012 mailed Oct. 8, 2021.

* cited by examiner

METHOD OF MANAGING AN AEROSOL-GENERATING DEVICE

CROSS-REFERENCE TO RELATED APPLICATIONS

The present application is a national phase entry under 35 U.S.C. § 371 of International Application No. PCT/EP2021/069012, filed Jul. 8, 2021, published in English, which claims priority to European Application No. 20186051.7, filed Jul. 15, 2020, the disclosures of which are incorporated herein by reference.

FIELD OF INVENTION

The present invention relates to a method of managing an aerosol generating device for efficient usage. More specifically, it relates to an aerosol generating device such as e-cigarettes, heat-not-burn devices, and the like which is capable of indicating battery usage to a user based on certain parameters.

BACKGROUND

Inhalers or aerosol generating devices such as e-cigarettes or vaping devices are becoming increasingly popular. They generally heat or warm an aerosolisable substance to generate an aerosol for inhalation, as opposed to burning tobacco as in conventional tobacco products. The generated aerosol may contain a flavour and/or a stimulant (e.g., nicotine or other active component). Such devices are usually powered by a battery which needs to be recharged depending on the usage.

During use it may be desirable for a user to know if the device is running low on battery and therefore needs to be recharged. However, frequent notifications for battery-level may annoy the user. Moreover, depending on the mode of use, battery-level notification may only be desired or required at certain times.

Therefore, there exists a need for a device that can provide intelligent battery-level notification to the user during use in accordance with the usage.

SUMMARY OF THE INVENTION

According to an aspect of the present invention, there is provided a method of operating an aerosol generating device comprising recording a period of active use of the device; detecting a puff inhaled by a user; determining if a battery-level notification had been provided to the user in the said period before the puff detection; determining a battery-level of the device if no notification had been provided previously; and generating an indication on the device for the user if the determined battery-level is below a predetermined level.

Advantageously, in the way the user is provided a low battery notification intelligently as a reminder to recharge the device while not bothering the user too much by avoiding providing frequent notifications.

Preferably, the said period of active use of the device is a session comprising puffs grouped according to a configurable rule.

Preferably, the configurable rule comprises grouping detected puffs into a respective session at least based on an interval between consecutive puffs.

Preferably, said period of active use of the device is a preset time period.

Preferably, the indication is provided within a predefined interval after the puff is detected.

Preferably, the predefined interval is between 1 and 2 seconds.

Preferably, the method further comprises detecting a start and an end of the puff, wherein the predefined interval is measured after the end of the puff.

Preferably, no indication is generated if a next puff is detected within the predefined interval.

Preferably, no indication is generated if a notification was provided previously at the start of the said period of active use.

Preferably, the method further comprises determining a positional orientation of the device, wherein the said period of active use of the device is recorded according to the determined positional orientation.

According to another aspect of the invention, there is provided an aerosol-generating device comprising a puff sensor configured to detect a puff inhaled by a user; a controller configured to record a period of active use of the device; determine if a battery-level notification had been provided to the user in the said period before the puff detection; determine a battery-level of the device if no notification had been provided previously; and an indicator configured to provide an indication to the user if the determined battery-level is below a predetermined level.

Preferably, the controller is further configured to define the period of active use of the device as a session comprising puffs grouped according to a configurable rule and set a flag for the indication provided during the session.

Preferably, the controller is further configured to define the period of active use of the device as a preset time period and timestamp the indication provided during the preset time period.

Preferably, the device further comprises an orientation sensor to determine a positional orientation of the device when in active use.

According to another aspect of the invention, there is provided a computer-readable storage medium comprising instructions which, when executed by a computer, cause the computer to carry out the steps of the method described above.

BRIEF DESCRIPTION OF THE DRAWINGS

Embodiments of the invention are now described, by way of example, with reference to the drawings, in which.

DETAILED DESCRIPTION

Next, various aspects of the invention will be described. Note that the same or similar portions are denoted with the same or similar reference signs in the descriptions of the drawings below. Note that the drawings are schematic and a ratio of each size is different from a real one. Therefore, specific sizes and the like should be judged in consideration of the following descriptions.

Figure 1:
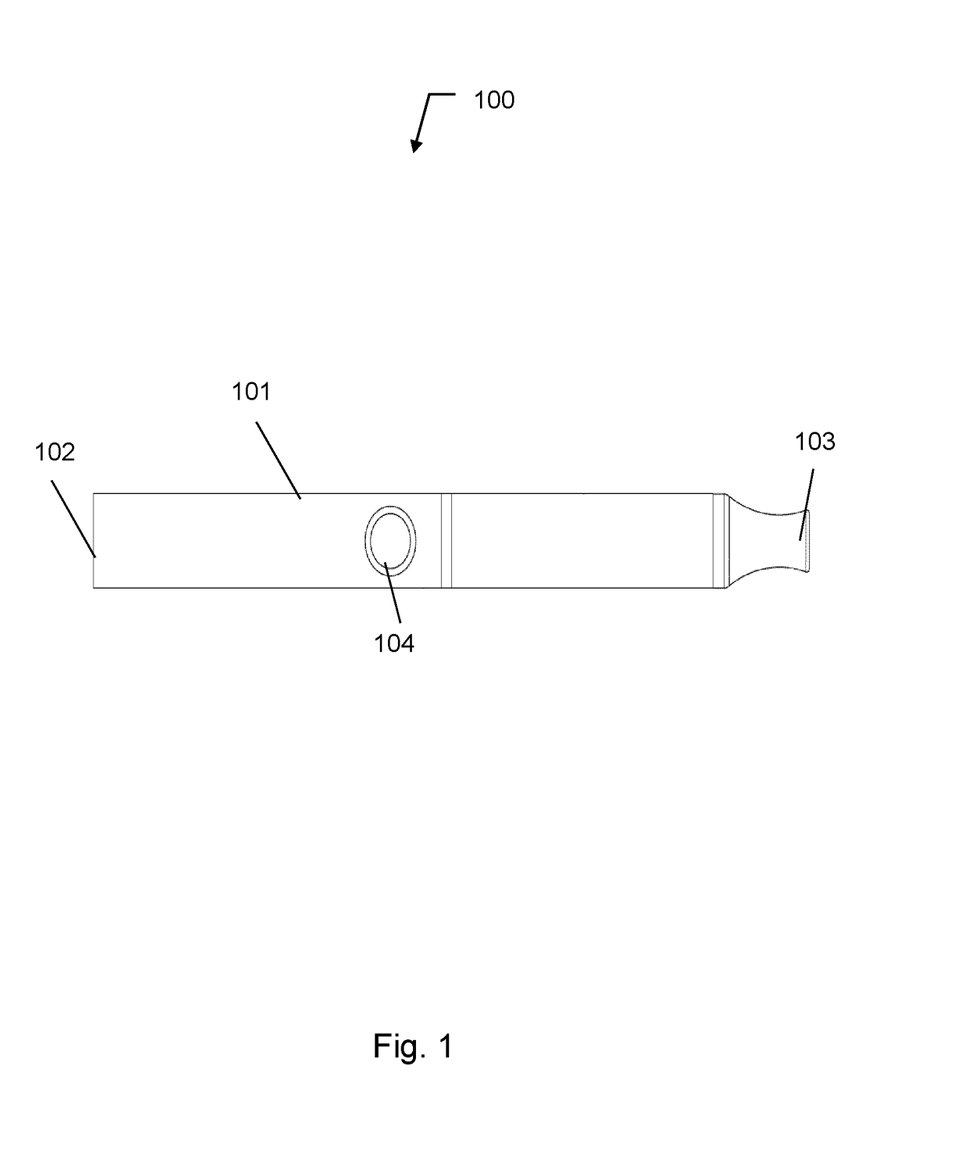
FIG. 1 shows an aerosol generating device according to an aspect of the invention.

FIG. 1 shows a non-combustion-type aerosol generating device 100, which is a device for inhaling an aerosol by heating or vaporisation without combustion. The device 100 has a rod-like shape with a main body 101 extending from a non-mouthpiece end 102 to a mouthpiece end 103. An air channel or path is defined in the main body 100 between the opposite ends 102, 103. The aerosol-generating device 100 in the present example is an electronic cigarette or a vaping device, and is referred to as e-cig 100 hereinafter. The e-cig 100 works by vaporizing or heating an aerosol source inserted into the e-cig 100 to release a flavour and/or a stimulant for a user to inhale through the mouthpiece end 103. The construction and operation of such a device to generate aerosol is well-known in the art and it will be understood by a skilled person that the invention disclosed herein can be applicable to aerosol generation devices in any shapes, configured with any aerosol generating techniques, not limited to the example.

The e-cig 100 may include an activation switch 104 that may be configured to perform at least one of a turn-on and a turn-off of a power source of the e-cig 100. The activation switch 104 may be a push button or a touch button disposed at any convenient location on the surface of the main body 101 of the e-cig 100. Alternatively, the e-cig 100 does not rely on a switch button to activate power supply to heater, but rely on a puff sensor to detect air flow and trigger the device to start generating aerosol.

Figure 2:
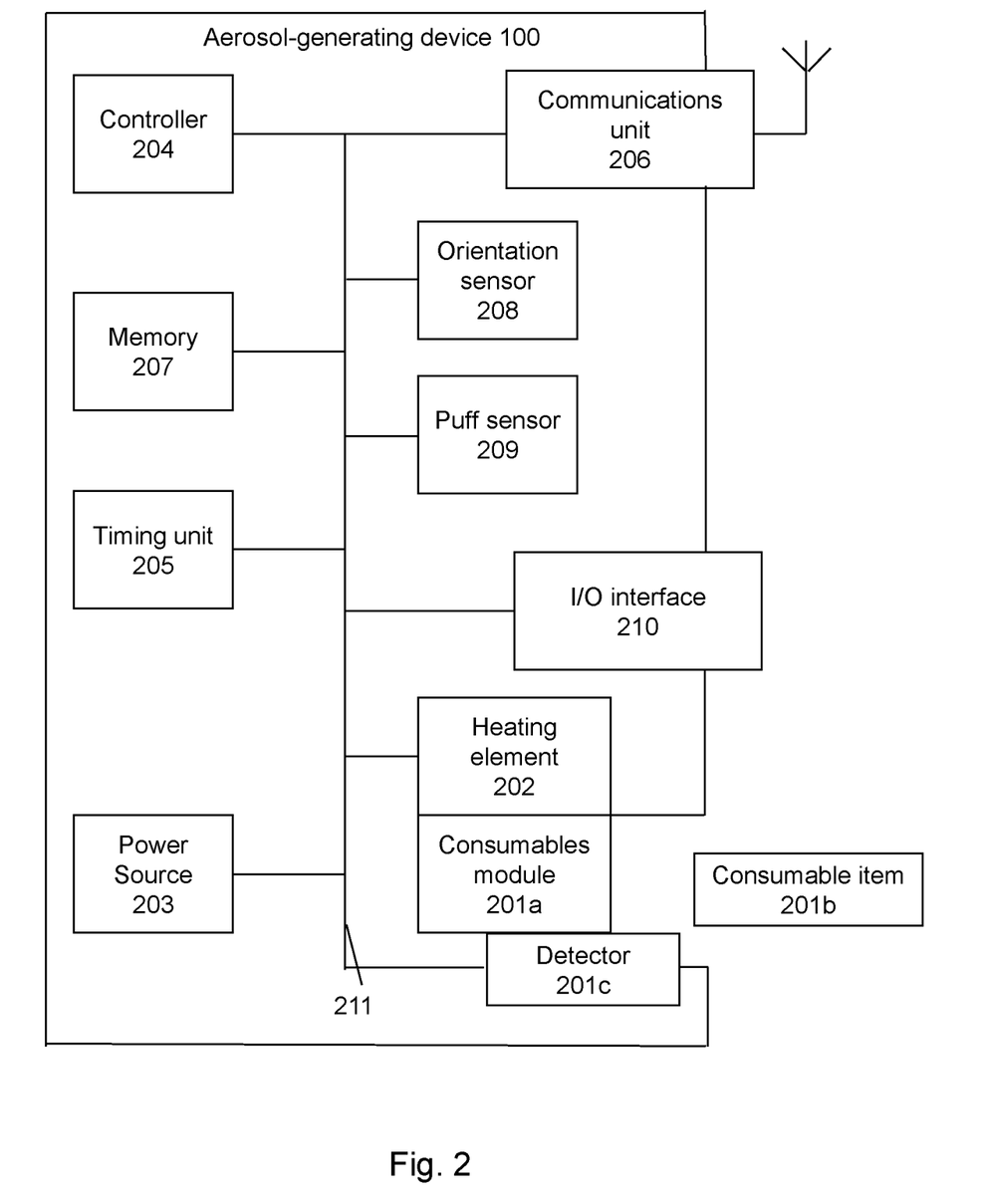
FIG. 2 shows a block diagram of various components of the device of FIG. 1.

FIG. 2 is a block diagram showing various components or modules of the e-cig 100. In one example, the e-cig 100 comprises a consumables module 201*a* and a heating element 202 that vaporizes a consumable item 201*b* received by the consumables module 201*a* to release aerosol containing the flavour and/or stimulant for the user to inhale. In the present example, the consumable item 201*b* is a substance containing nicotine. Presence of the consumable item 201*b* in the consumables module 201*a* may be detected by a detector 201*c*. The consumable item 201*b* may be in the form of solid or liquid and is heated by the heating element 202 to release the aerosol without combustion. In case the consumable item 201*b* is a liquid store, more than one consumable items can be received at the consumable module 201*a*. The heating element 202 may be powered by a power source 203.

The power source 203 is, for example, a lithium ion battery. The power source 203 supplies an electric power necessary for an action of the e-cig 100. For example, the power source 203 supplies the electric power to all other components or modules included in the e-cig 100. The power source 203, also referred to as a battery 203 hereinafter, can be recharged using an external power supply using a wired connection (e.g. via a USB port and cable) or wirelessly (e.g. via a wireless charging pad).

For the purposes of the present description, it will be understood that the terms vapour and aerosol are interchangeable. In some examples, the heating element is arranged within a capsule or cigarette-like aerosol generating material and connectable to the aerosol generation device, rather than being a component of the aerosol generation device itself.

In one embodiment, a flavouring is present in the consumable item 201*b*. The flavouring may include Ethylvanillin (vanilla), menthol, Isoamyl acetate (banana oil) or similar. In another embodiment, the consumable item 201*b* may include an additional flavour source (not shown) provided on the side of the mouthpiece end 103 beyond the consumables module 201*a* the consumable item 201*b*, and generates a flavour to be inhaled by the user together with the aerosol generated from the consumable item 201*b*. In yet another embodiment, the e-cig 100 comprises more than one consumable item each comprising a flavouring and/or a certain level of active component (nicotine). In this case, each consumable item can be independently heated to generate aerosol.

The e-cig 100 also includes a controller 204 that is configured to control various components in the e-cig. For example, the controller 204 may control and/or monitor the power source 203, a timing unit 205 (comprising a timer), a communications unit 206, a memory 207, an orientation sensor 208, and a puff sensor 209 included in the e-cig 100. The timing unit 205 is configured to provide time information (e.g., time of the day) and generate timestamp for puff data or event data, which is helpful to analyse user's vaping preferences. The timing unit 205 is further configured to monitor timing of each puff and breaks in between and provide this information to the controller 204 to monitor and potentially restrict the user's usage of the e-cig 100. For example, the timing unit 205 may determine when to indicate the user on reaching a puff threshold. It is to be noted that the functions of the timing unit 205 can be consolidated into the controller 204.

The controller 204 monitors the charging and discharging state of the battery 203. Depending on the mode of operation (as described below), the controller 204 determines if the battery-level of the battery 203 is below a predetermined level and provide an indication to the user via the I/O interface 210. Such indication is preferably based on inputs received from the orientation sensor 208, the puff sensor 209, and the timing unit 205.

The communications unit 206 is configured to manage communication with any personal computing device, a server, a tracking device, or other e-cigs in the vicinity of the e-cig 100. The memory 207 is configured to store vaping usage history and information such as user settings and preferences.

The e-cig 100 may also include various sensors such as the orientation sensor 208 and the puff sensor 209. The orientation sensor 208, such as a gyroscope, and/or an accelerometer, or a tilt sensor or any other suitable sensor, is configured to determine a positional orientation of the e-cig 100, for example, determining if the e-cig 100 is held face up or face down when in use. When the e-cig 100 is used with front face up (such that the activation button 104 and/or an LED and/or a logo is facing upwards), a first mode of operation is activated. This mode is also referred to as the session mode. It is to be understood that the orientation sensor may be implemented by an algorithmic combination of information gathered by various sensors to give an estimate of the roll, pitch, and yaw of the device.

When the e-cig 100 is used with front face down (such that the activation button 104 and/or an LED is facing downwards), a second mode of operation is activated. This mode is also referred to as the free mode. In other words, the e-cig 100 is rotated or turned by 180 degrees along its longitudinal axis to switch between the session mode and the free mode.

It is to be noted that the e-cig 100 facing up or down may also be defined with respect to any visual pattern, such as a logo or a surface design, to act as a reference for the user. Activation button and LED may not be necessary to provide such reference. In any case, sensors on the device may not be reliant on these physical or visual elements.

The puff sensor 209 is configured to detect puff actions of inhaling and its output can be used to determine the number of puff actions of inhaling the aerosol. Output of the puff sensor 209 can also be used to determine a time period required for one puff action of inhaling the aerosol. The recorded usage data can comprise puff duration (i.e., length of a puff), a puff interval (i.e., the time between consecutive puffs), and a fluid and/or nicotine consumption amount. The puff sensor can simply be a detector such as microphone disposed in the flowpath of the device or a MEMS piezoresistive absolute pressure sensor.

The e-cig 100 may also include a consumable recognition sensor (now shown) configured to identify the consumable item 201b inserted in the e-cig 100. The recognition sensor may be included in the consumables module 201a or the detector 201c. The recognition sensor may use NFC, RFID or any other known technique to recognise the strength of the stimulant contained in the consumable item 201b from an NFC/RFID tag disposed on the consumable 201b.

The e-cig 100 may also include an Input-Output (I/O) or user interface 210 configured to provide indications to the user and to receive inputs from the user. The I/O interface 210 preferably comprises an indication device and an input device. The indication device may comprise a visual light emitting element including one or more Light Emitting Diodes (LEDs), a screen display, or a sound emitter, or other appropriate means to provide indication to users. The visual light-emitting element such as an LED may be disposed at the tip of the non-mouthpiece end 102, or on a side surface of the e-cig 100. Such an LED may exhibit various light-emitting mode to provide to user within indication of a puff state where the aerosol is being inhaled, a non-puff state where the aerosol is not being inhaled, a pre-heating state when the heater is heating up, a ready-to vape state when the heater operates at target temperature to generate aerosol, a depletion state where LED bar shows depletion level of the aerosol source, and any other information related to the operation status of the e-cig. In the present invention, the indication device of the I/O interface 210 also provides battery-level indication to the user. The indication may be provided is provided to the user via visual, audio, or haptic means. The input device can be one or more user operable buttons or sensible touch panel, responsible to depression, toggling, or touch.

All the elements described above transmit and/or receive command and/or data via communication bus 211.

In one embodiment, the e-cig 100 is also configured to communicate with a personal computing device (now shown) owned by the user. The personal computing device may be a smartphone, tablet, or, a laptop. For the sake of simplicity, the personal computing device is referred to as smartphone hereinafter. Preferably, the e-cig 100 is configured to communicably connect or pair with the smartphone wirelessly using Wi-Fi, Bluetooth, or other wireless communication standards. The smartphone preferably runs a mobile application (commonly referred to as App) that allows the user to interact with the e-cig 100 through a user-friendly interface. The App may be hosted by the manufacturer of the e-cig 100 and compatible with different mobile platforms such as iOS™ and Android™.

Figure 3:
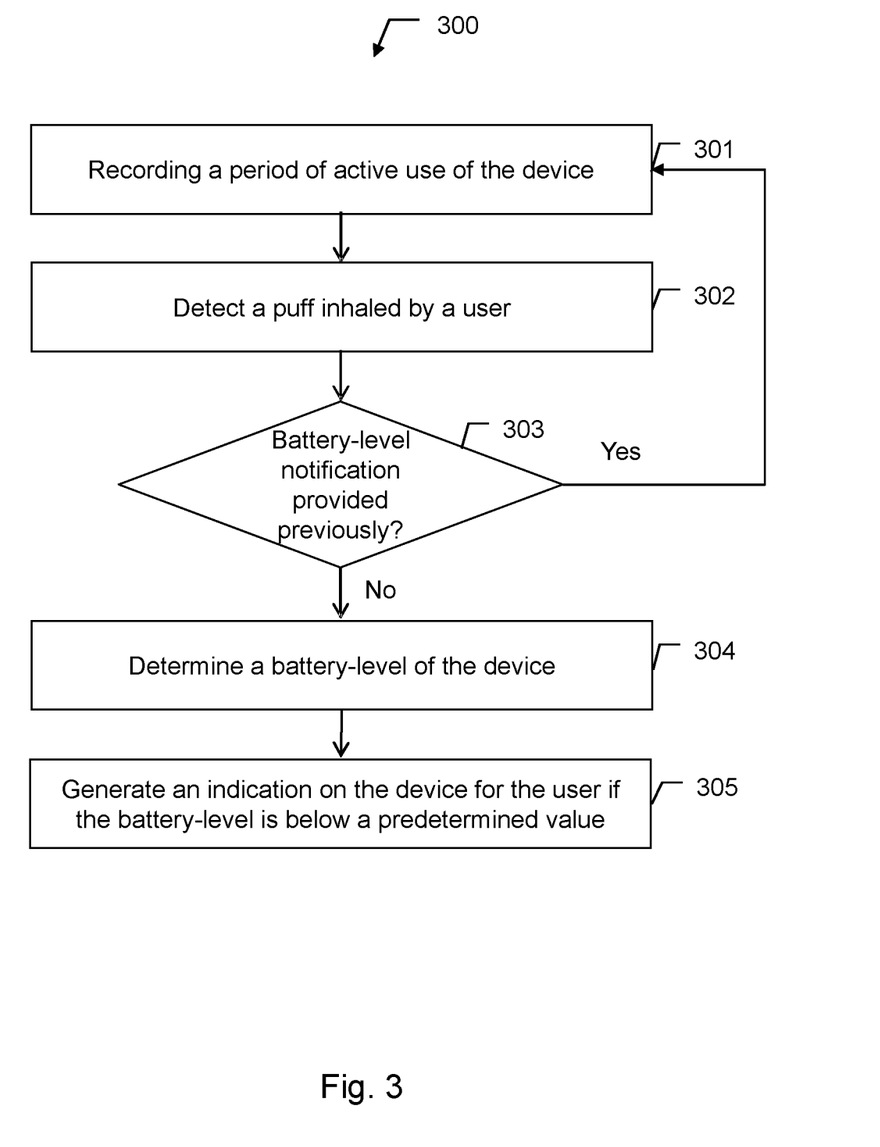
FIG. 3 shows a flow diagram of a method of operating the device of FIG. 1.

FIG. 3 shows a flow diagram for a process 300 of operating the e-cig 100. It is to be noted that steps in the process 300 may not necessarily be performed in the same sequence. Also, not all steps are shown and some of the steps may be optional and can be omitted.

At step 301, a period of active use of the device is recorded. In the present example, the controller 204 monitors the period of active use of the e-cig 100 by the user. The said period of active use may be defined in a number of ways as described below.

In a first embodiment, the period of active use may be a session comprising puffs grouped according to a configurable rule. The configurable rule may be preconfigured by the device manufacturer or can be configured and/or re-configured by the user according to his or her preferences by connecting the device to a smartphone. One such configurable rule could be, for example, grouping the detected puffs into a respective session at least based on a time interval between consecutive puffs. For example, if the user takes a break shorter than a preset time period (such as 7 minutes) between two consecutive puffs, such puffs are grouped together in one session. However, when the next puff following the previous one is detected after 7 minutes, that puff and the following ones (taken within 7 minutes) are grouped in a new session.

In a second embodiment, the period of active use may be a predetermined or preset period (e.g., 7 or 10 mins or 15 mins) that can be preconfigured by manufacturer or re-configured by user according to his or her preferences. The number of puffs inhaled or breaks taken between consecutive puffs within this preset time period is immaterial. For example, in the preset period of active use of 7 minutes, the user may intake only two puffs with a long break or intake 5 puffs with a few short breaks in-between the puffs.

In one further embodiment, the device employs and consolidates two definitions for said period of active use described above. In such embodiment, the said period of active use is automatically selected based on an operational state of the e-cig 100 such as its operation mode, device orientation, and other device characteristics. This provides additional flexibility to the user and improves user experience. For example, determination of the period of active use may be based on the mode of operation of the e-cig 100 determined by device orientation. When the user starts to use the e-cig 100, the orientation sensor 208 in the e-cig 100 determines if the e-cig 100 is held in a position facing up or facing down. Optionally, the orientation sensor 208 may be activated when the user pushes the activation switch 104. In addition, there may be a motion sensor which detects a movement of the e-cig 100 in addition to the activation of the activation switch 104. Signals from the orientation sensor 208, the activation switch 104, and the motion sensor may all be processed by the controller 204 to determine if one of the two modes of operation is to be activated.

When the user is inhaling in face up orientation, the session mode is activated in which the said period of active use is a session comprising grouped puffs, as in the first embodiment described above. A session may be defined based on an interval between puffs. For example, if a break between the puffs is less than 7 minutes, the next puff is counted in the same session and if the break is more than 7 minutes, the next puff is counted in a new session. On the other hand, when the user is inhaling in face down orientation, the free mode is activated in which the said period of active use is a preset time period, as in the second embodiment described above. For example, 7 minutes or 10 minutes or 15 minutes of active use irrespective of puffs.

At step 302, a puff inhaled by the user is detected. In the present example, when it is determined that the device is in active use, irrespective of the orientation, the controller 204 starts monitoring the usage of the e-cig 100 with the aid of the puff sensor 209 and the timing unit 205. The puff sensor 209 detects each puff inhaled by the user and the timing unit 205 time stamps each puff as well as monitors the start and end of each puff. When the period of active use is defined according to the first embodiment or the device is operating in the session mode, the timing unit 205 starts and stops a timer between two consecutive puffs and monitors a break in a session. On the other hand, when the period of active use is defined according to the second embodiment or the device is operating in the free mode, the timing unit 205 monitors the preset time period. Nonetheless, in all embodiments, the number of puffs inhaled by the user may be counted and recorded to analyse the user's vaping pattern over time.

At step 303, it is determined whether a battery-level notification was provided previously. In the present example, after the puff is detected, the controller 204 checks if any indication for battery-level was provided to the user during the said period of active use. In the first embodiment or in the session mode of operation, this means determining if the user was provided an indication previously during the current session. On the other hand, in the second embodiment or in the free mode of operation, this means if the user was provided an indication previously during the preset time period. If such an indication was provided previously, then the controller 204 continues recording the period of active use at step 301. However, if no such indication was provided previously, the process moves to step 304.

At step 304, a battery-level of the device is determined. In the present example, the controller 204 reads a battery-level of the battery 203 of the e-cig 100. Determining a remaining charge in a battery such as a Li-Ion battery is well-known in the art. This determination is made to check if the battery level has fallen below a predetermined threshold level, for example, less than 25%. Falling beyond this level, the e-cig 100 may not operate with full efficiency or simply cease of operate if the usage is not lowered or the battery is recharged. Therefore, it is necessary to monitor the battery-level of the e-cig 100 during use.

At step 305, an indication is generated for the user if the battery-level is below a predetermined level. In the present example, the controller 204 signals the I/O interface 210 to generate an indication for the user when the battery-level of the battery 203 falls below the predetermined level during use. Such an indication may be provided by flashing an LED in certain colour or pattern and/or vibrating the e-cig 100 for a short time. The indication is preferably generated after a brief period of completion of the puff, for example, between an interval of one and two seconds after the end of the puff is detected. However, no indication is provided if a puff is detected within this interval.

A notification for battery-level is provided to the user only once during the period of active use if the battery-level is determined to be below the predetermined threshold level. In the first embodiment or in the session mode of operation, after a battery-level notification is provided to the user by an indication, a flag is set by the controller 204 indicating that a notification was already provided in the current session so that the following puffs in the same session do not trigger further indication. If the user is in session mode and takes a long break such that additional puffs are counted in a separate session, they are provided with a subsequent battery indication after the first puff in that separate session. In this way, if the battery-level is below the predetermined threshold level, the user still receives additional reminders to charge the device, without repeated reminders within a single session. In the second embodiment or in the free mode of operation, after the device provides a notification on battery-level to the user, the timing unit 205 records a timestamp for the indication and by way of the time stamp, the period of active use can be recorded as starting from the time of last battery notification. No further notification is provided to the user in the preset period of active use (e.g. 7 minutes) from the timestamp. However, if the user takes a puff later than that preset period from the previous indication, then a new battery indication is provided. In this way, if the battery level is below the predetermined threshold level, the user still receives additional reminders to charge the device, without repeated reminders within a preset period.

It is to be noted that in all embodiments above, when the notification for battery-level is provided at the start of the period of active use, no further indication is generated in the said period of active use. Similarly, in all embodiments above, if the user begins a separate period of active use, an additional indication is provided after a puff is taken in that period. Therefore the user is provided with occasional warnings when they continue to use the device with a low battery-level, but are not interrupted excessively during use of the e-cig 100.

A low battery-level notification is only provided after the first puff in the period of active use. In the first embodiment or in the session mode of operation, once the user activates the device and starts taking puffs to vape, the device starts recording a session of puffs as a period of active use. Since no indication can be provided before the first puff of the session (i.e., no indication provided in the recorded period of active use), the device will proceed to check its battery level and provide an indication of critically low battery level. However, in this example, if no indication is provided after checking battery level which is above the predetermined threshold level (e.g., 25%), the device will not check its battery level in the same session nor provide a notification. In other words, the device does not provide notification after following puffs in the same session even if a battery level indication has not been previously provided in the currently recorded session of puffs (recorded period of active use). If the battery level is critically low when the user starts vaping, a notification on battery level will be provided after the first puff. If the battery level is not critically low (e.g., above 25%), the device does not provide any indication of battery level even if the battery level gets lower due to powering the heating element while the user vapes. This is to not bother the user unnecessarily during the use of the e-cig 100. In the second embodiment or in the free mode of operation, the period of active use is a preset time period of 7 mins, when the user starts vaping by taking a first puff, the device determines whether a notification was previously provided in the past 7 mins (regardless of the device being used to vape or not). In case the user takes a break longer than 7 mins and no notification is provided, the device proceeds to check its battery level. If the battery level is critically low (e.g., below 25%), a notification is provided, i.e., after the first puff.

Optionally, if the battery notification criteria is met after the first puff and a notification is provided accordingly, the device repeats the notification periodically, i.e., the notification is not only provided after the first puff but also after every nth puff. This is done to remind the user to recharge the e-cig 100 if the battery is running low. It should be noted that in the second embodiment when the recorded period of active use is a preset time period (e.g., 7 mins or 10 mins or 15 mins), if the battery is low, the device will trigger periodic notifications for every period. In the example of 7 mins as the preset value, a new period of active use will be recorded every 7 mins and if the battery notification criteria is met, a notification is provided accordingly for every 7 mins.

In an alternative embodiment, the device monitors all puffs in a vaping session and checks whether a notification criteria is met after each detected puff to trigger a battery-level indication. In this case, once the user takes the device and starts a vaping session by taking the first puff, if the battery level is not lower than the predetermined threshold and no notification is provided after the first puff, the device checks the battery level after each following puffs and if the determined battery level becomes lower than the threshold level, the device triggers a notification. The user is thus notified of the low battery-level in the middle of a vaping session, if after the first puff the battery-level is above the predetermined level (such as 25%) but after a few minutes of vaping the battery-level drops below 25%. An indication is therefore generated to provide a notification to the user accordingly. This is to notify the user in time, whenever the battery level drops to a critical low level, advantageous for situation if the user takes long vaping sessions (e.g., vaping longer than 30 mins or so).

Figure 4:
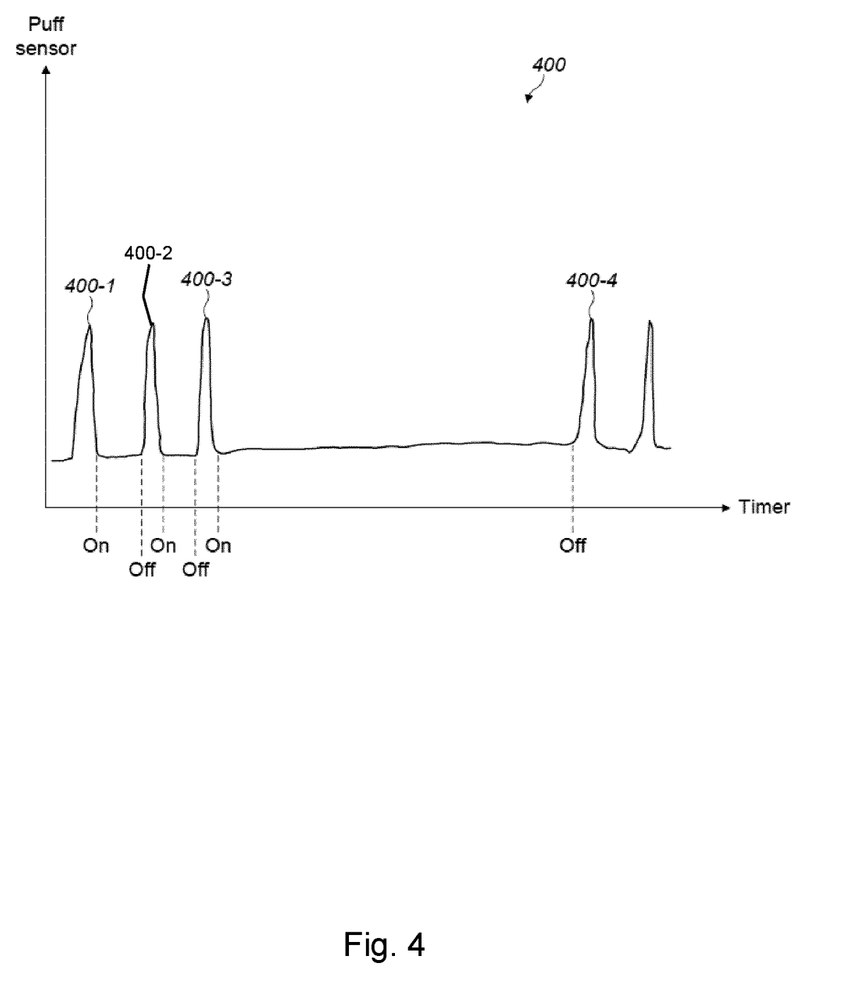
FIG. 4 shows a graph illustrating a control operation of the device of FIG. 1.

FIG. 4 shows a graph 400 illustrating related responses of the timing unit 205 and the puff sensor 209 in the e-cig 100. The response of the timing unit 205 is plotted on the X-axis against the response of the puff sensor 209 on the Y-axis. The puff sensor 209 detects a first puff 400-1 taken by the user. As soon as the first puff 400-1 is ended, the timing unit 205 starts a timer, i.e. at the trailing edge of the puff wave. The timing unit 205 keeps monitoring the time and the timer is ON until a next puff is detected. As soon as the next puff is detected, i.e. at the leading edge of the next puff wave, the timer is turned OFF. The timer is turned ON again at the trailing edge of this puff wave.

In one example, in the period of active use, after the first puff 400-1 is detected, the timer is turned ON for monitoring the time after the end of the first puff 400-1. As soon as the start of the next puff 400-2 is detected, the timer is turned OFF. The time interval between turning ON and turning OFF of the timer is determined. In the present example, this time interval is determined to be less than a preset time period, say 7 minutes. Therefore, the puffs 400-1 and 400-2 are grouped in one session. Likewise, the following puff 400-3 is also detected within the period of 7 minutes, so puffs 400-1, 400-2, and 400-3 are grouped in the same session. In this specific example, a battery level notification is not provided more than once during the same session according to criteria explained above, as the session comprising puffs 400-1 to 400-3 is relative short.

After the puff 400-3, the user takes a long break before taking the next puff 400-4. The time interval between the puffs 400-3 and 400-4 is determined to be longer than 7 minutes, therefore, the puff 400-4 is counted in a new session. As previously explained, at this point, a battery-level of the device is determined and if it is found to be below a threshold level, a battery-level notification is provided to the user. In this case, an indication is provided to the user to notify low battery within a predetermined time interval after the end of the puff 400-4. For example, within 1-2 seconds after the end of the puff 400-4, the user is indicated by audio, visual, haptic means, or a combination of these.

In the session mode, the controller 204 uses the information from the timing unit 205 to monitor breaks taken by the user between the puffs. If the period of break taken between two consecutive puffs, as determined by the timer being turned ON and OFF, is within a preset time period the controller 204 keeps counting the puffs in succession in the same session. On the other hand, when the period of break exceeds the preset time period, e.g. 7 minutes, the controller 204 restarts counting the puffs in a new session. As shown in FIG. 4, after the third puff 400-3 the user takes a long break and then takes the next puff 400-4. If this long break is shorter than 7 minutes, then the timing unit 205 counts this as fourth puff in the same session. However, if this long break is longer than 7 minutes, the timing unit 205 resets the counter and counts the puff 400-4 is the first puff in a new session.

The controller 204 also monitors a situation in which the user accidently holds the e-cig 100 with face down (hence operate in the free mode) when the user actually intended to continue holding the e-cig 100 with face up (hence operate in the session mode). The controller 204 determines that the e-cig 100 is accidently held in the face down orientation if the user turns it back to the face up orientation within a correction threshold. The controller 204 therefore continues counting the puffs in the session mode. In this way, the device does not bother the user too much by intelligently determining a vaping session.

The processing steps described herein carried out by the main control unit, or controller, may be stored in a non-transitory computer-readable medium, or storage, associated with the main control unit. A computer-readable medium can include non-volatile media and volatile media. Volatile media can include semiconductor memories and dynamic memories, amongst others. Non-volatile media can include optical disks and magnetic disks, amongst others.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

As used herein, the term "non-transitory computer-readable media" is intended to be representative of any tangible computer-based device implemented in any method or technology for short-term and long-term storage of information, such as, computer-readable instructions, data structures, program modules and submodules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

The invention claimed is:

1. A method of operating an aerosol generating device comprising:

recording, using a controller, a period of active use of the device;

detecting, using a puff sensor configured to detect puffs inhaled by a user, a puff inhaled by the user;

determining, using the controller, whether a battery-level notification was provided to the user in said period before the puff detection;

determining, using the controller, whether a battery-level of the device is below a predetermined level if the battery-level notification was not provided to the user in said period before the puff detection; and generating, using the controller, an indication on the device for the user if the determined battery-level is below the predetermined level.

2. The method of claim 1, wherein said period of active use of the device is a session comprising puffs grouped according to a configurable rule.

3. The method of claim 2, wherein the configurable rule comprises grouping detected puffs into a respective session at least based on an interval between consecutive puffs.

4. The method of claim 1, wherein said period of active use of the device is a preset time period.

5. The method of claim 1, wherein the indication is provided within a predefined interval after the puff is detected.

6. The method of claim 5, wherein the predefined interval is between 1 and 2 seconds.

7. The method of claim 5, further comprising detecting a start and an end of the puff, wherein the predefined interval begins after the end of the puff.

8. The method of claim 1, further comprising:
determining, using the controller, whether a next puff is detected within a predefined interval; and
generating the indication on the device for the user if the next puff was not detected within the predefined interval.

9. The method of claim 1, further comprising determining a positional orientation of the device, wherein said period of active use of the device is recorded according to the determined positional orientation.

10. An aerosol-generating device comprising:
a puff sensor configured to detect a puff inhaled by a user; and
a controller configured to:
record a period of active use of the device;
detect, using the puff sensor, a puff inhaled by the user
determine whether a battery-level notification was provided to the user in the said period before the puff detection;
determine whether battery-level of the device is below a predetermined level if the battery-level notification was not provided to the user in said period before the puff detection; and
generate an indication on the device if the determined battery-level is below the predetermined level.

11. The device of claim 10, wherein the controller is further configured to define the period of active use of the device as a session comprising puffs grouped according to a configurable rule and set a flag for the indication provided during the session.

12. The device of claim 10, wherein the controller is further configured to define the period of active use of the device as a preset time period and timestamp the indication provided during the preset time period.

13. The device of any of claim 10, further comprising an orientation sensor to determine a positional orientation of the device when in active use.

14. A computer-readable storage medium comprising instructions which, when executed by a computer, cause the computer to carry out the steps of:
recording a period of active use of the device;
detecting, using a puff sensor configured to detect a puff inhaled by a user, the puff inhaled by the user;
determining whether a battery-level notification was provided to the user in said period before the puff detection;
determining whether a battery-level of the device is below a predetermined level if the battery-level notification was not provided to the user in said period before the puff detection; and
generating an indication on the device for the user if the determined battery-level is below the predetermined level.

* * * * *